(12) United States Patent
Danziger et al.

(10) Patent No.: US 12,254,653 B2
(45) Date of Patent: Mar. 18, 2025

(54) TARGET FOR MULTISPECTRAL GEOMETRICAL CALIBRATION

(71) Applicant: FORESIGHT AUTOMOTIVE LTD., Ness Ziona (IL)

(72) Inventors: Moshe Danziger, Karnei Shomron (IL); Daniel Brosh, Zur Hadassa (IL); Shaked Yarden, Kiryat Tivon (IL)

(73) Assignee: FORESIGHT AUTOMOTIVE LTD., Ness Ziona (IL)

( * ) Notice: Subject to any disclaimer, the term of this patent is extended or adjusted under 35 U.S.C. 154(b) by 90 days.

(21) Appl. No.: 18/021,795

(22) PCT Filed: Aug. 18, 2021

(86) PCT No.: PCT/IL2021/051008
§ 371 (c)(1),
(2) Date: Feb. 16, 2023

(87) PCT Pub. No.: WO2022/038606
PCT Pub. Date: Feb. 24, 2022

(65) Prior Publication Data
US 2023/0316572 A1    Oct. 5, 2023

Related U.S. Application Data

(60) Provisional application No. 63/066,844, filed on Aug. 18, 2020.

(51) Int. Cl.
| | |
|---|---|
| *G06T 7/80* | (2017.01) |
| *G01J 5/08* | (2022.01) |
| *G06T 5/50* | (2006.01) |
| *G06T 5/92* | (2024.01) |
| *H04N 17/00* | (2006.01) |

(52) U.S. Cl.
CPC .............. *G06T 7/80* (2017.01); *G01J 5/0859* (2013.01); *G06T 5/50* (2013.01); *G06T 5/92* (2024.01); *H04N 17/002* (2013.01); *G06T 2207/10048* (2013.01)

(58) Field of Classification Search
CPC .............. G06T 7/80; G06T 5/92; G01J 5/0859
USPC .......................................................... 348/64
See application file for complete search history.

(56) References Cited

FOREIGN PATENT DOCUMENTS

WO    2009117265 A1    9/2009

OTHER PUBLICATIONS

St-Laurent,L.,et al. Passive calibration board foralignment of VIS-NIR, SWIRand LWIR images. Quantitative Infra Red Thermography Journal,2017,14.2:193-205(Jul. 19, 2017)[online]. (Year: 2017).*

(Continued)

*Primary Examiner* — Jeffery A Williams
(74) *Attorney, Agent, or Firm* — The Roy Gross Law Firm, LLC; Roy Gross

(57) ABSTRACT

A target and a method of calibration of an IR camera unit is disclosed. The target may include, a substantially flat metallic plate, such that a first surface of the metallic plate has a surface roughness of between N9 to N10; and a pattern made from a polymeric ink applied on the first surface. The method may include, receiving from an IR camera, included in the camera unit, an image of the target taken in the infrared spectrum; extracting parameters, related to the camera, form the image; and calibrating the camera based on the extracted first parameters.

14 Claims, 17 Drawing Sheets

(56) References Cited

OTHER PUBLICATIONS

St-Laurent, L., et al. Passive calibration board for alignment of VIS-NIR, SWIR and LWIR images. Quantitative InfraRed Thermography Journal, 2017, 14.2: 193-205 (Jul. 19, 2017) [online], [Retrieved on Dec. 15, 2021].
Acampora, L., et al. 3d reconstruction of thermal images. In: Proceedings of 26th Aerospace Testing Seminar. 2011. p. 263-277. (Mar. 2011). [online], [Retrieved on Dec. 15, 2021]. Retrieved from the internet: <URL: https://www.researchgate.net/profile/Luigi-Acampora/publication/233407848_3D_Reconstruction_of_Thermal_Images/links/0c96051bae21aa6380000000/3D-Reconstruction-of-Thermal-Images.pdf>.
Liu Ruixuan et al: "Multiple Methods of Geometric Calibration of Thermal Camera and A Method of Extracting Thermal Calibration Feature Points", Multiple Methods of Geometric Calibration of Thermal Camera and A Method of Extracting Thermal Calibration Feature Points, Jun. 20, 2018 (Jun. 20, 2018), XP055908602, Retrieved from the Internet: URL:https://henryzh47.github.io/assets/documents/multiple-methods-geometric.pdf retrieved on Apr. 4, 2022].
International Search Report for PCT/IL2021/051008 Completed Dec. 16, 2021; Mailed Dec. 16, 2021 3 pages.
Written Opinion for PCT/IL2021/051008 Completed Dec. 16, 2021; Mailed Dec. 16, 2021 7 pages.

\* cited by examiner

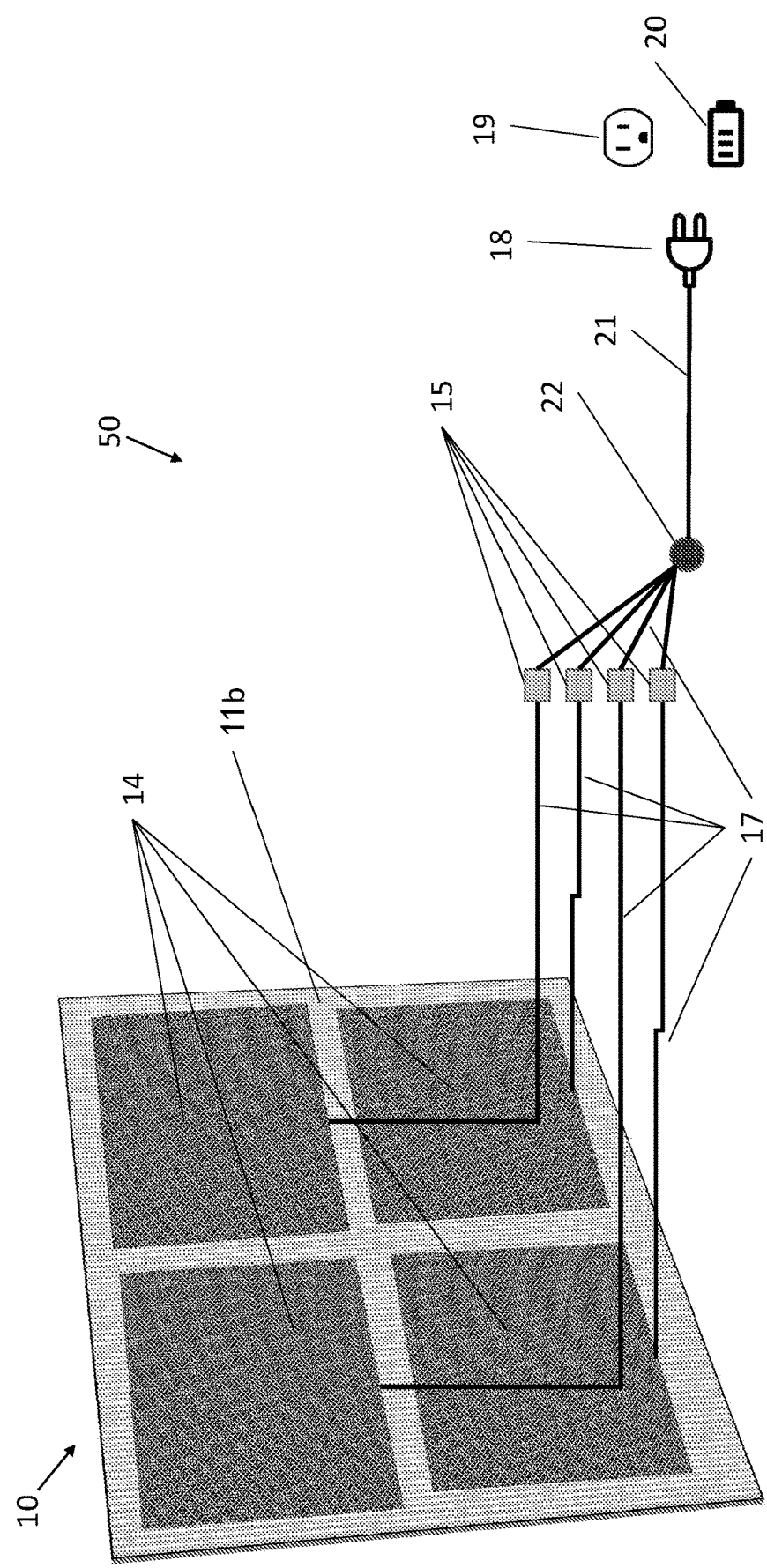

TARGET FOR MULTISPECTRAL GEOMETRICAL CALIBRATION

CROSS-REFERENCE TO RELATED APPLICATIONS

This application is a National Phase of PCT Patent Application No. PCT/IL2021/051008 having International filing date of Aug. 18, 2021, which claims the benefit of priority of U.S. Patent Application No. 63/066,844, filed Aug. 18, 2020, which are hereby incorporated by reference in their entirety.

FIELD OF THE INVENTION

The present invention relates generally to multispectral calibration. More specifically, the present invention relates to targets for multispectral geometrical calibration.

BACKGROUND OF THE INVENTION

Cameras are the most precise instruments available to capture accurate data at high resolution. As with human eyes, cameras capture the resolution, minutiae, and vividness of a scene with such detail that no other sensors, including radar, ultrasonic, and lasers, can match.

Due to the manufacturing processes, many aberrations can disrupt the image quality of the sensors. These aberrations can be distortion, defocus and almost any other parameter that can affect image quality. This is true for all types of cameras or sensors capturing data in all spectral bands, especially in imaging sensor which are typically between the Visible-LWIR spectrum (0.4 um-14 um).

In order to correct these manufacturing and assembly differences and errors there is a need to run each imaging sensor through a series of tests and calibrations which includes among others; lens focusing, sharpness testing, lens quality using MTF tests, geometrical calibration of one sensor (intrinsic) and of 2 or more sensors that are geometrically calibrated one to another (extrinsic), and dynamic range testing.

Each of the processes above are well known and have been around and developed for years now, for visible light imaging devices. In the past decades or even less, new types of imaging devices have been developed which enable capturing images in other wavelengths starting with NIR (near infrared), SWIR (short wave infrared), MWIR (mid wave infrared) and LWIR (long wave infrared), in spectrum between 0.7 um (700 nm) and 14 um (14000 nm).

Manufacturing new technology raises challenges not only of how to manufacture and capture the information with the sensor but also how to focus or calibrate the imaging systems and test them. The longer the wavelength, the less trivial it is to perform all standardized and well-known processes of imaging systems.

For example, geometric calibration is required in existing monocular and multi-view geometry-based computer vision algorithms and applications. Due to the manufacturing process, distortion is introduced to the cameras, making objects appear distorted on the image. Lens distortion increases as the pixel approach the border of the image. Such optic distortion leads to inaccurate transformation map between 3-dimensional (3D) object points and 2-dimensional (3D0 image points. In the geometry-based vision, an accurate 3D to 2D mapping is required. Therefore, geometric calibration is a crucial step that directly influences the accuracy and performance of algorithms and applications. There is a need to test all geometrical photometrical parameters of the optical system (sensor and lens) for common ground discussion and apply correction calculations by calibrating to imaging system to a known target. Many of these tests and calibrations are well known and have been practiced for decades, especially in visible light imaging systems.

Some specific examples for prior art target and calibration methods are illustrated in FIGS. 1-5.

FIG. 1 in an illustration of a standard calibration checkerboard target 23.

The visible light imaging system detects the contrast difference between the white areas 1 and black areas 2 enabling corner detection algorithms to calibrate geometrical aberrations and errors on the manufacturing and assembling process.

FIG. 2 is an illustration of a standard MTF target.

The visible light imaging system detects the contrast difference between the white areas 3 and black areas 4 enabling modulation transfer function (MTF) algorithms to calculate the resolution, spatial frequency, and sharpness of the imaging system FIG. 3 is an illustration of a standard focusing target:

The visible light imaging system detects the contrast difference between the white areas 5 and black areas 6 enabling focus and sharpness algorithms to calculate the ideal focusing point of the imaging system FIGS. 4A and 4B are illustrations of a comparison between of a corner sharpness of LWIR thermal camera (FIG. 4B) vs. visible light camera (FIG. 4A) of a standard checkerboard target.

When using a standard checkerboard target which is printed on cardboard or other materials, the visible light imaging system can detect and calculate the exact corner down to pixel and even subpixel accuracy 7, while the LWIR camera cannot distinguish the exact corner of the black and white squares, thus leading to a statistical error of exact corner detection resulting inaccurate geometrical calibration corrections 8. This is the case even when the black 2 and white 1 areas have different emissivity properties and heated with a flood lamp or in the sun for a while, creating a temperature difference between the black areas 2 and the white areas 1.

FIGS. 5A and 5B are illustrations images of MTF cardboard target taken visible light camera (FIG. 5A) and LWIR thermal camera (FIG. 5B). When using a standard MTF target which is printed on cardboard or other materials, the visible light imaging system has a resolution, spatial frequency 9, and sharpness of the imaging system with extreme accuracy and precision. However, as shown in FIG. 5B, the LWIR camera cannot distinguish the black from white lines in high spatial frequencies 10, thus leading to statistical errors resulting in non-ideal focus, resolution tests and spatial frequency characteristics of the LWIR imaging system. This is the case even when the black 4 and white 3 areas have different emissivity properties and heated with a flood lamp or in the sun for a while, creating a temperature difference between the black areas 4 and the white areas 3.

Therefore, applying the known method and targets for visible light camera for non-visible light imaging systems like MWIR and LWIR, is nonpractical. Since the spectral response is different between the regular calibration and test targets, there is a need for combining multiple solutions of materials for receiving good response and accurate results, while simultaneously eliminating unwanted reflections from the surrounding environment, which impairs the contrast of the captured image and can even lead to completely unusable data and information.

The challenge behind multi spectral geometric camera units' calibration and testing resides in having a calibration target that produces sufficient image contrast simultaneously in all wavebands of interest. The situation gets even more complicated when calibration must be performed outdoors, where the environmental conditions (temperature, humidity, illumination, wind, reflection etc.) change with time. To perform geometric calibration, features of the target must be extracted and localized in images generated by all sensors. Better is the contrast (or SNR), better is the localization of the calibration target features, and more accurate is the spatial registration of images.

It is an object of present invention to provide a cheap, easy to manufacture targets for calibrating IR cameras that can be used for simultaneous calibration of visible light cameras.

SUMMARY OF THE INVENTION

Some aspects of the invention may be directed to a target for multispectral geometrical calibration, comprising:
(a) a substantially flat metallic plate, wherein a first surface of the metallic plate has a surface roughness of between N9 to N10; and
(b) a pattern made from a polymeric ink applied on the first surface.

In some embodiments, the metallic plate is made from an aluminum alloy. In some embodiments, the target includes at least one heating element attached to a second surface of the flat metallic plate. In some embodiments, the target includes an array of heating elements attached to a second surface of the flat metallic plate. In some embodiments, the target includes a controller configured to control the heating elements to heat the target. In some embodiments, the controller configured to control the heating elements to heat the target to a temperature of 1° C. to 5° C. above room temperature.

In some embodiments, the first surface is characterized by having less than 0.1 emissivity and the pattern is characterized by having more than 0.8 emissivity. In some embodiments, the pattern comprises at least two elements having different colors. In some embodiments, a first element is characterized by a first grey level and a second element is characterized by a second grey level, darker than the first grey level. In some embodiments, a first element is characterized by a first color and a second element is characterized by a second color, different from the first color.

Some additional aspects of the invention may be directed to a method of calibration of an IR camera unit, comprising, receiving from a first IR camera, included in the camera unit, a first image of a target taken in the infrared spectrum; extracting first parameters, related to the first camera, form the first image; and calibrating the first camera based on the extracted first parameters. In some embodiments, the target comprises: a substantially flat metallic plate, wherein a first surface of the metallic plate has a surface roughness of between N9 to N10; and a pattern made from a polymeric ink applied on the first surface.

In some embodiments, the method may further include, receiving from a second IR camera, included in the camera unit, a second image of the target taken in the infrared spectrum; extracting second parameters, related to the second camera, form the second image; and calibrating the first camera and the second camera based on the extracted first parameters and the extracted second parameters.

In some embodiments, the IR spectrum comprises: NIR, SWIR, MWIR and/or LWIR.

In some embodiments, the method may further include, heating the target to a temperature of 1° C. to 5° C. above room temperature. In some embodiments, the deviation in the temperature across the entire target is less than 0.5° C.

In some embodiments, the pattern in the target comprises at least two elements having different colors, and the method further comprises, heating the target to at least two different temperatures, receiving images of the target taken at the at least two different temperatures; identifying changes between the at least two elements in the images; and calibrating the camera based on the identified changes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is an illustration of a system comprising multiple heating elements connected to different temperature controllers, according to some embodiments of the invention;

Figure 1:
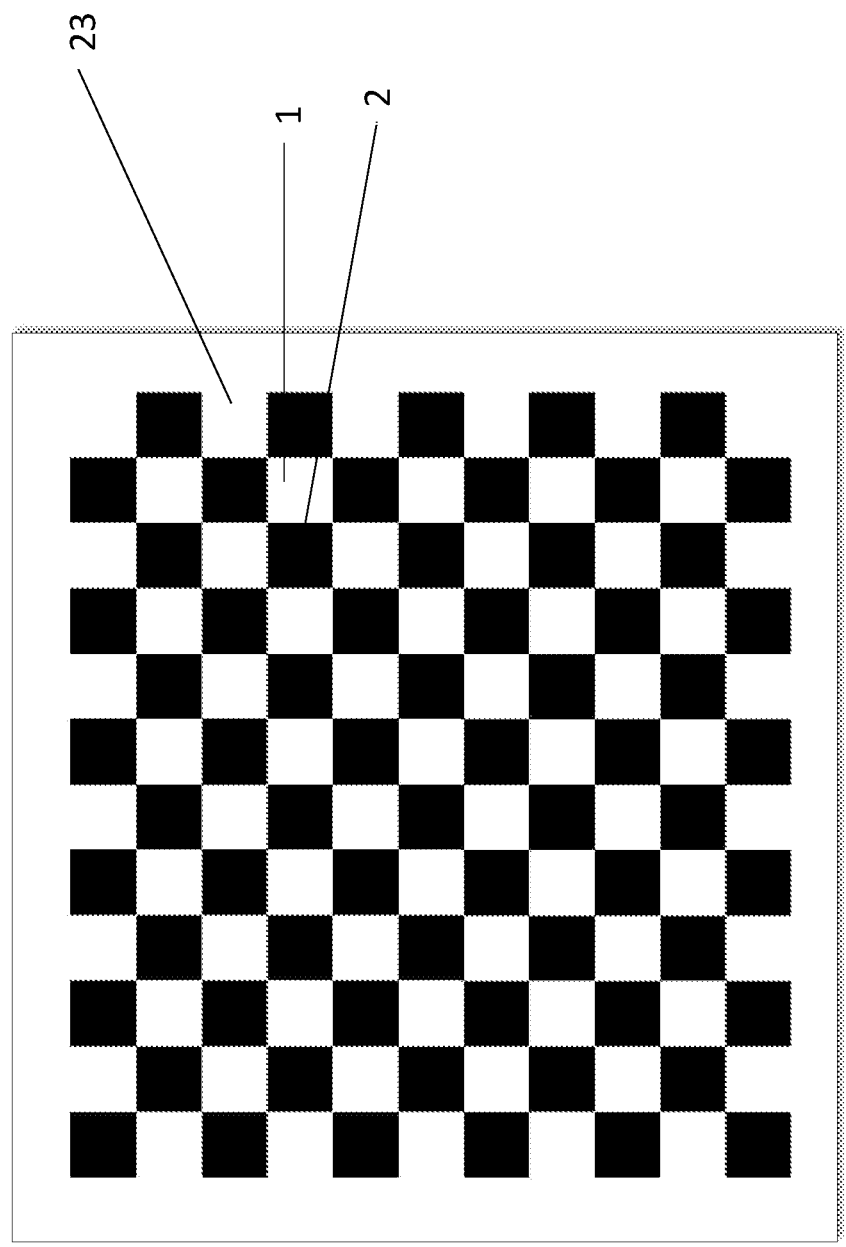
FIG. 1 is an illustration of a prior art calibration checkerboard target.
Figure 2:
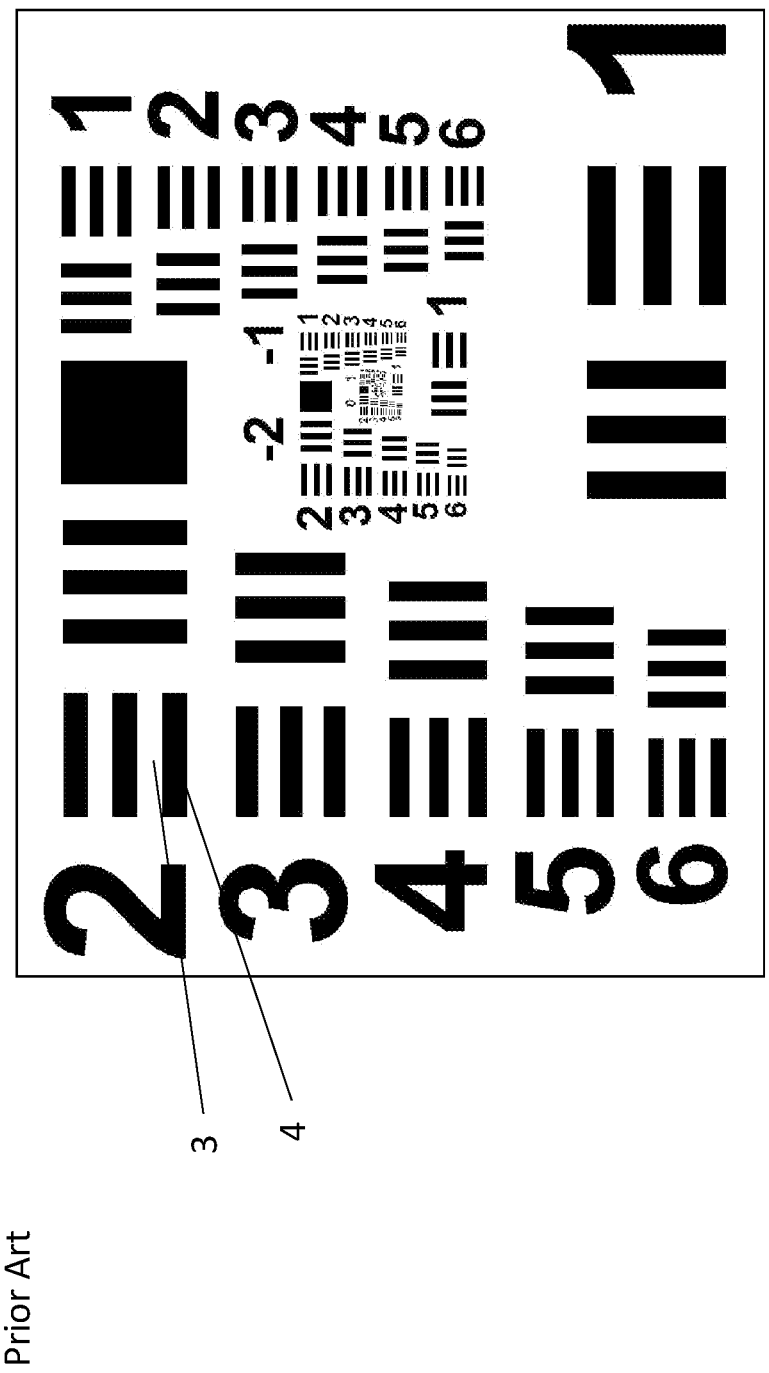
FIG. 2 is an illustration of a prior art MTF target.
Figure 3:
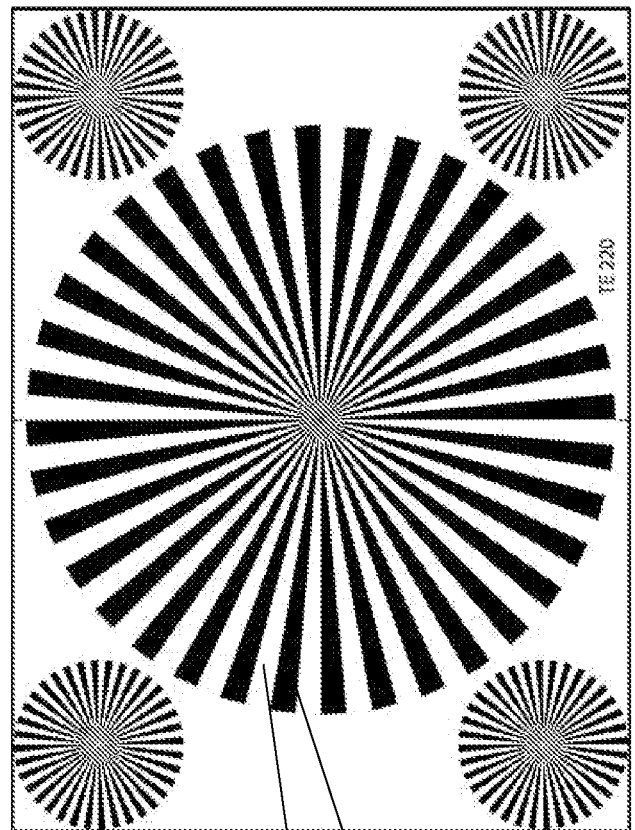
FIG. 3 is an illustration of a prior art focusing target.
Figures 4A, 4B:
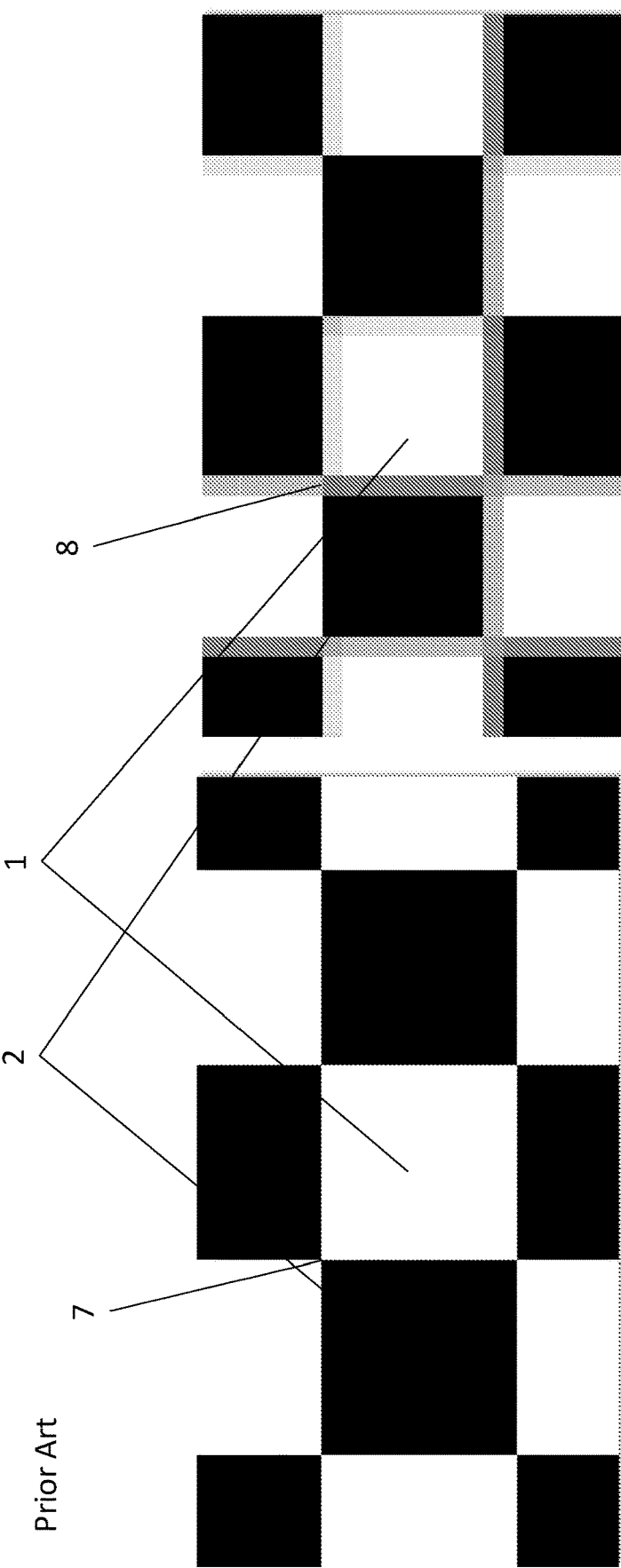
FIGS. 4A and 4B are illustrations of a comparison between of a corner sharpness of LWIR thermal camera (FIG. 4B) vs. visible light camera (FIG. 4A) of a prior art checkerboard target.
Figures 5A, 5B:
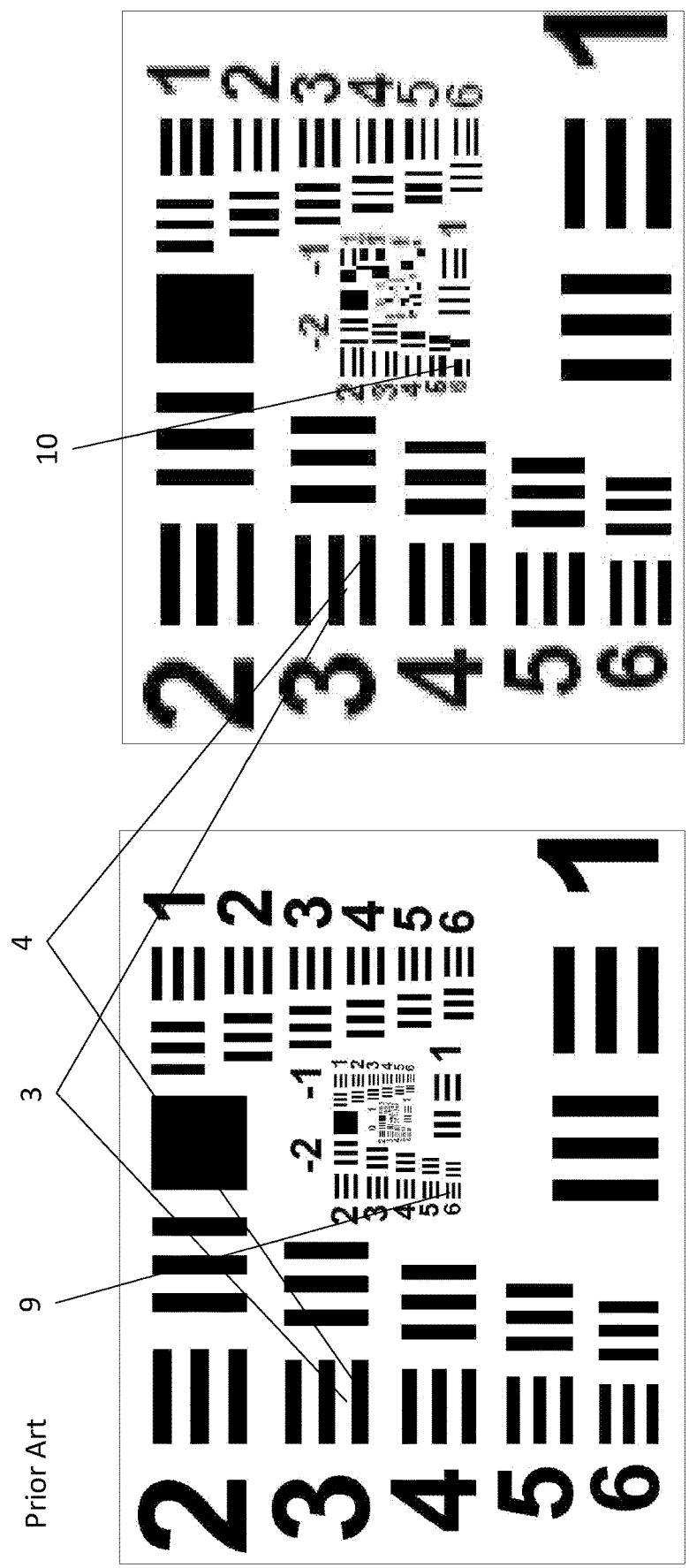
FIGS. 5A and 5B are illustrations of prior art images of MTF cardboard target using visible light camera and LWIR thermal camera.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Some aspects of the invention may be related to a single calibration target that can be used for calibrating wide variety of cameras configured to capture images at wavelengths from the visible light all the way to the long wave infrared (LWIR) (e.g., from 0.4 µm-14 µm). Such a target requires to have different contrast visibility in the visible light and emissivity difference for the IR rage.

To solve the problem a special target was made from a plate having a first surface characterized with a low emissivity (e.g., below 0.1) partially covered by a pattern made from a material having relatively high emissivity (e.g., above 0.8). Furthermore, the first surface and the pattern may be visibly (in the visible light) distinguished by having two different colors. Therefore, the pattern printed on the surface can be detected both in the visible light spectrum and in the IR spectrum, for example, in response to raise in the temperature of the first surface.

As used herein the IR spectrum includes near IR (NIR) from 0.8-0.9 µm, short wave IR (SWIR) from 0.9-2.5 µm, medium wave IR (MWIR) from 3-5 µm, and LWIR from 7-14 µm. The IR spectrum have wavelength from 0.8 to 14 µm.

As used herein visible light includes light having wavelength from 0.4 to 0.8 µm.

The major obstacle the inventors have to overcome is how to create a pattern having emissivity difference in the IR spectrum that may provide sharp detectable edges. Prior art methods were all found to be insufficient for testing and calibration capabilities.

Moreover, prior art techniques for creating areas with high emissivity differences for IR calibration result in highly reflective areas in the visible light spectrum, and the IR spectrum, for example, the LWIR. The rule of thumb is that shiny materials have low emissivity, and dull materials have high emissivity, so creating an emissivity difference inevitably causes some of the target to be shiny and reflective.

Furthermore, the reflections from other bodies or objects on the target's field of view can also lead to low contrast and even phase inversion where some of the "black" areas become "white" and vise-versa. It may be very difficult to control all the small reflections from the surrounding especially if the calibration or testing is done outdoors or at uncontrolled environment.

In some embodiments, to overcome these problems and obstacles a target made from a metallic plate having a first surface characterized a surface roughness of between N9 to N10 was proposed. In a nonlimiting example, a brushed aluminum backboard was used. The backboard was roughly brushed so as not to reflect visible light. Furthermore, the inventors surprisingly found that a surface having roughness of between N9 to N10 traps the IR (e.g., even LWIR) reflections from the environment emitters such as human bodies, monitors or even light bulbs. The result was a low emissivity target (e.g., below 0.1) without reflections in the IR spectrum.

In some embodiments, the target is printed with any desired pattern and/or color made from a polymeric ink. The polymeric ink may have very high emissivity (e.g., above 0.8) In a nonlimiting example, a black polymeric ink was used which has a contrast in the visible light in comparison to the light grey color of the brushed aluminum backboard.

In some embodiments, one or more heating elements may be attached to the back (e.g., the second surface) of the plate. A nonlimiting example may include a three-dimensional (3D) printed heating pad. The one or more heating elements may be controlled to heat the plate to a temperature of, 0.5, 1, 1.5, 2, 2.5, 3 3.5, 4, 4.5, 5° C. or more, above room temperature. In some embodiments, larger temperature ranges may be used for dynamic range tests of the thermal spectrum.

In some embodiments, the one or more elements may heat the plate homogeneously. For example, the temperature differences across the first surface may not exceed 0.5° C. In some embodiments, the temperature differences across the first surface may not exceed 0.4° C. In some embodiments, the temperature differences across the first surface may not exceed 0.3° C. In some embodiments, the temperature differences across the first surface may not exceed 0.2° C. In some embodiments, the temperature differences across the first surface may not exceed 0.1° C. In some embodiments, the temperature differences across the first surface may not exceed 0.05° C. In some embodiments, the temperature differences across the first surface may not exceed 0.0.1° C.

In some embodiments, the conductive metallic plate heat's up almost immediately, but since the emissivity of the first surface is close to 0 and the emissivity of the printed ink on top of it is close to 1 (or 100%), a thermal IR camera may detect the difference between the printed areas and the background plate, with no reflection from the surrounding environment.

Figures 6A, 6B:
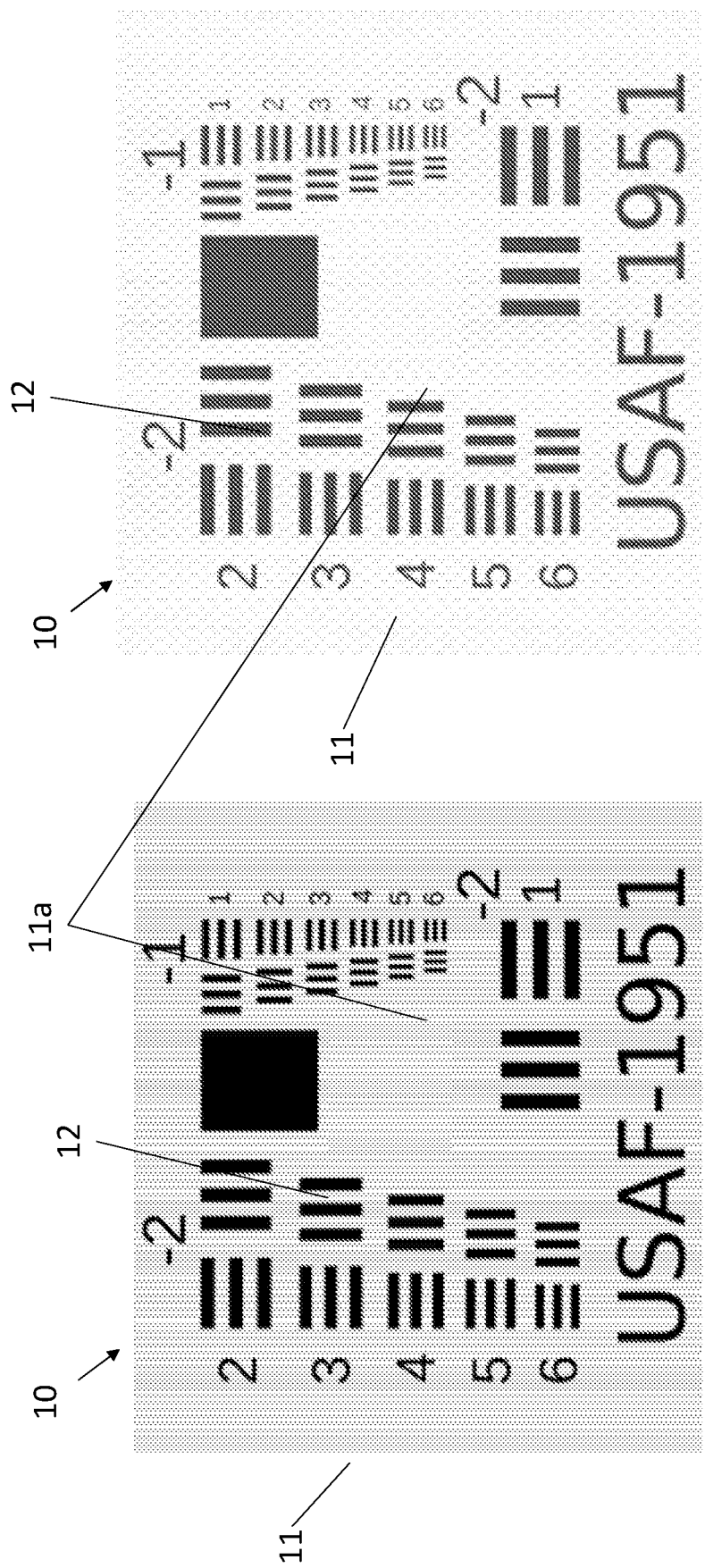
FIGS. 6A and 6B are illustrations of images of MTF target printed on metal plate using visible light camera and IR thermal camera according to some embodiments of the invention.

Reference is now made to FIGS. 6A and 6B which are illustrations of images of a single MTF target printed on metal plate using visible light camera (FIG. 6A) and IR thermal camera (FIG. 6B). A target 10 may include a substantially flat metallic plate 11. Metallic plate 11 may include a first surface 11a having a surface roughness of between N9 to N10. Illustration of plate 11 is given and discussed with respect to FIG. 7.

Target 10 may further include a pattern 13 made from a polymeric ink applied on the first surface, for example, the standard USAF-1951 MTF illustrated. In some embodiments, target 10 may be used for calibrating both visible light cameras and IR thermal cameras. As should be understood by one skilled in the art, the standard USAF-1951 MTF is given as an example only, and the invention as a whole, includes any suitable pattern, for example, a checkerboard, circular pattern, etc. The polymeric ink may include a polymeric matrix and a pigment, for example, a black pigment. In some embodiments, the color (e.g., pigment) of the ink may be selected to form a detectable contrast in the visible spectrum, between first surface 11a and the pattern. In a nonlimiting example, when surface 11a has a light grey color (e.g., brushed aluminum alloy), pattern 13 may include, black pigment, blue pigment, red pigment and the like. In some embodiments, pattern 13 may include at least two elements having different colors, as illustrated and discussed with respect to FIG. 16.

In some embodiments, first surface 11a is characterized by having less than 0.1 emissivity and pattern 13 is characterized by having more than 0.8 emissivity.

In some embodiments, first surface 11a is characterized by having less than 0.09 emissivity. In some embodiments, first surface 11a is characterized by having less than 0.08 emissivity. In some embodiments, first surface 11a is characterized by having less than 0.06 emissivity. In some embodiments, first surface 11a is characterized by having less than 0.03 emissivity. In some embodiments, first surface 11a is characterized by having less than 0.01 emissivity. In some embodiments, first surface 11a is characterized by having less than 0.001 emissivity.

In some embodiments, first surface 11a is characterized by having less than 0.2 emissivity. In some embodiments, first surface 11a is characterized by having less than 0.15 emissivity.

In some embodiments, pattern 13 is characterized by having more than 0.7 emissivity. In some embodiments, pattern 13 is characterized by having more than 0.85 emissivity. In some embodiments, pattern 13 is characterized by having more than 0.9 emissivity. In some embodiments, pattern 13 is characterized by having more than 0.95 emissivity. In some embodiments, pattern 13 is characterized by having more than 0.98 emissivity. In some embodiments, pattern 13 is characterized by having more than 0.99 emissivity.

Accordingly, due to the emissivity difference between the printed area and the metallic surface, even if the target is at room temperature, an IR camera may detect a faded image of the pattern without any background reflections impairing the image.

Figure 7:
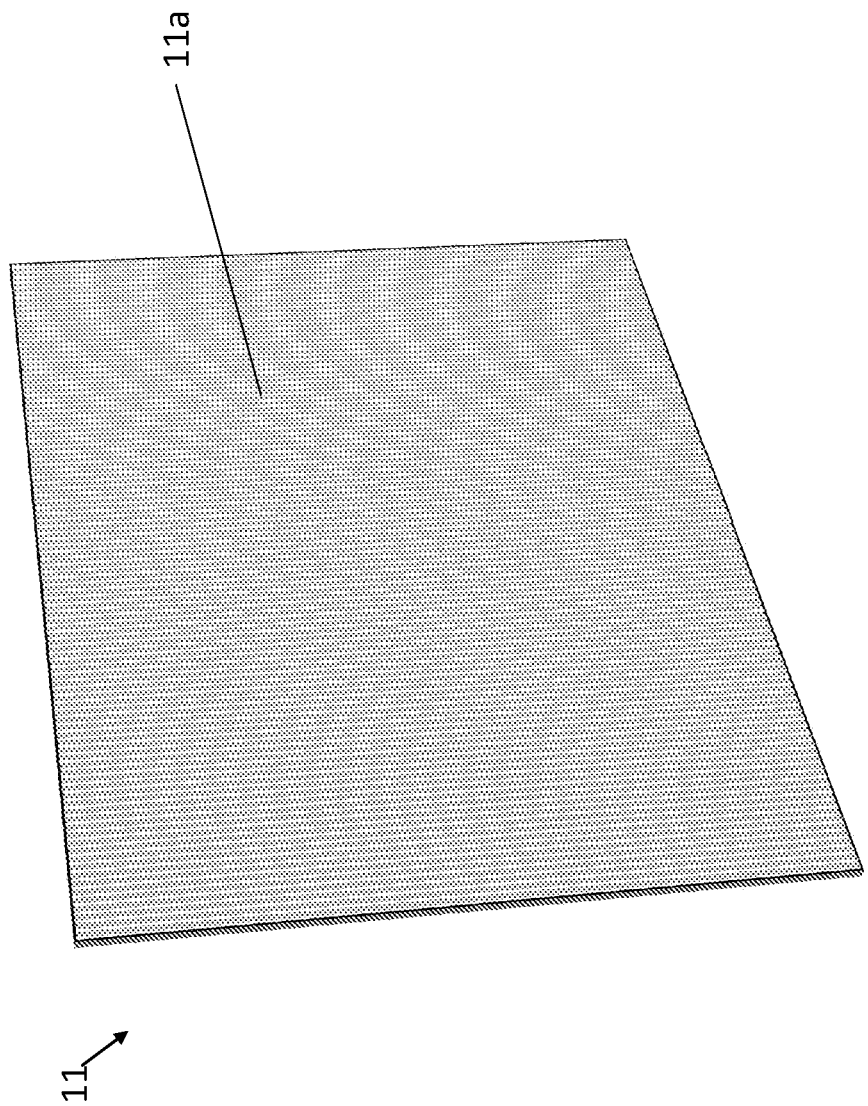
FIG. 7 is an illustration of an aluminum plate according to some embodiments of the invention.

FIG. 7 is an illustration of a metallic plate 11 according to some embodiments of the invention. Metallic plate 11 may include any suitable metal. In a nonlimiting example, the plate may include, SAE 5052 H-32, SAE 5056, SAE 5059, SAE 5083, SAE 5086 or any other suitable aluminum alloy. In some embedment, first surface 11a may be brushed, polished, machined, attached, etc., in order to have a surface roughness of between N9 to N10 (e.g., between 6-12 μM Ra).

Figure 8:
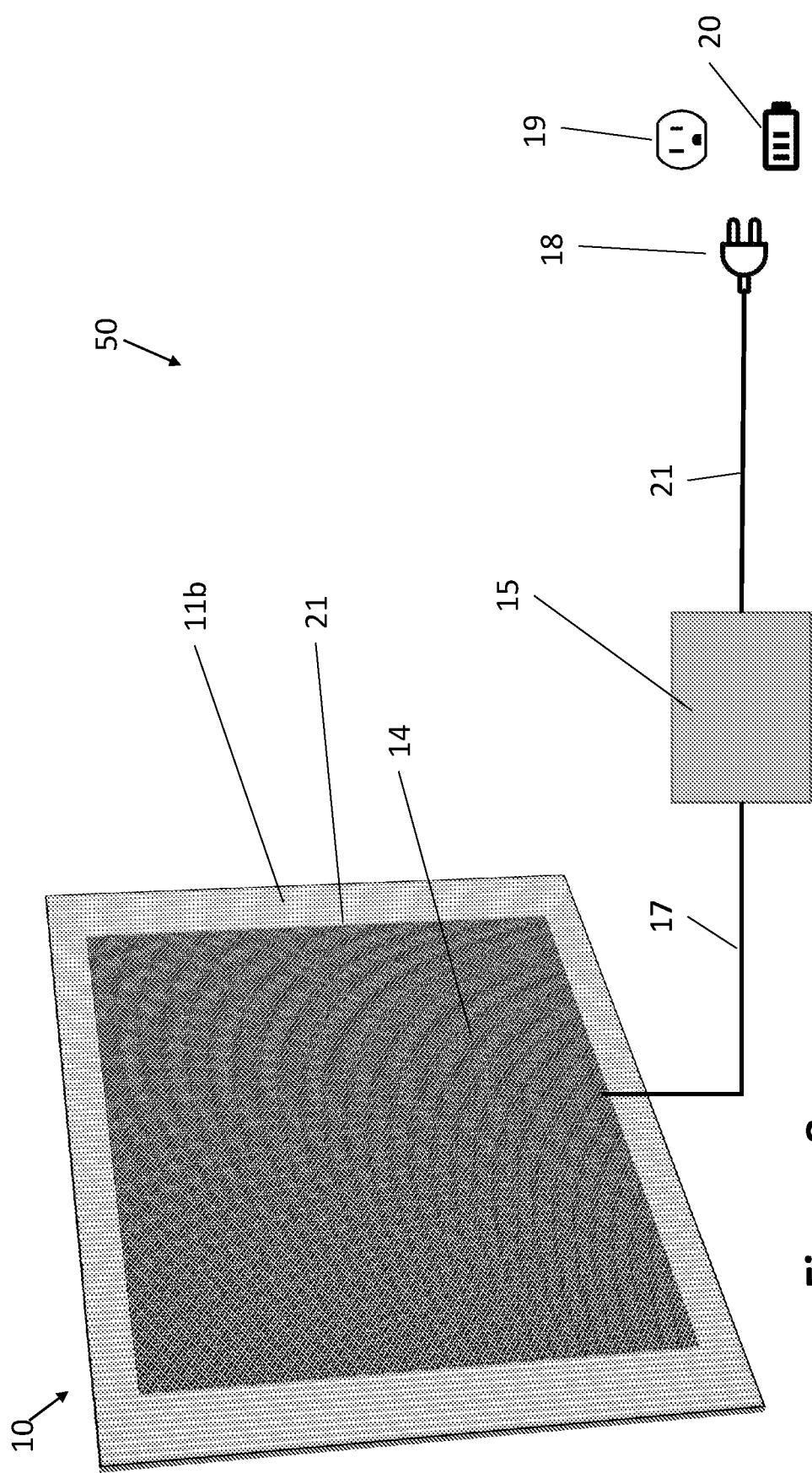
FIG. 8 is an illustration of a system comprising a heating element on the back of an aluminum plate, according to some embodiments of the invention.

Reference is now made to FIG. 8 which is an illustration of a system 50 for calibrating cameras according to some embodiments of the invention. System 50 may include target 10 that further comprises one or more heating elements 14 attached to a second surface 11b of the metallic plate. Heating element 14 may be any element that may heat target 10 to a temperature of 1° C. to 5° C. above room temperature. In some embodiments, one or more elements 14 may heat the plate homogeneously. For example, the temperature differences across first surface 11a may not exceed 0.5° C.

In the nonlimiting example illustrated in FIG. 8, a heating pad 14 is pasted/glued using any adhesive material 21 to second surface 11b of plate 11.

In some embodiments, system 50 may further include a controller 15 configured to control the heating elements to heat target 10. One or more heating elements 14 may be connected to controller 15 via cable 17. Controller 15 may further be connected to a power supply via cable 22. The power supply may be selected from a plug 18 connectable to a grid outlet 19 or a battery 20. In some embodiments, controller 15 may be configured to control one or more heating elements 14 to heat the target to a temperature of 1° C. to 5° C. above room temperature.

In some embodiments, system 50 may include one or more temperature sensors (not illustrated). The temperature sensors may be attached to plate 11 in one or more places and/or may be placed in the surrounding of target 10 in order to measure the room (e.g., ambient) temperature surrounding target 10. In some embodiments, the one or more sensors may be in communication, either wirelessly or by wires with controller 15. In some embodiments, controller 15 may control one or more heating elements 14 based on measurements received from the one or more temperature sensors.

Reference is now made to FIG. 9 which is an illustration of a system 50 in which target 10 comprises a plurality (e.g., 4) heating elements 14. Target 10 may include a plurality of heating elements 14 attached to second surface 11b of the metallic plate. In some embodiments, elements 14 may heat the plate homogeneously. For example, the temperature differences across the first surface may not exceed 0.5° C.

In some embodiments, system 50 may further include a plurality of controllers 15, each being configured to control a single heating element 14. Alternatively, two or more heating elements 14 may be connected and controlled by a single controller 15. Each heating elements 14 may be connected to a respective controller 15 via cable 17. In some embodiments, the plurality of controllers 15 may further be connected to a power supply via a junction point 22 and cable 22. The power supply may be selected from a plug 18 connectable to a grid outlet 19 or a battery 20.

Figure 10A:
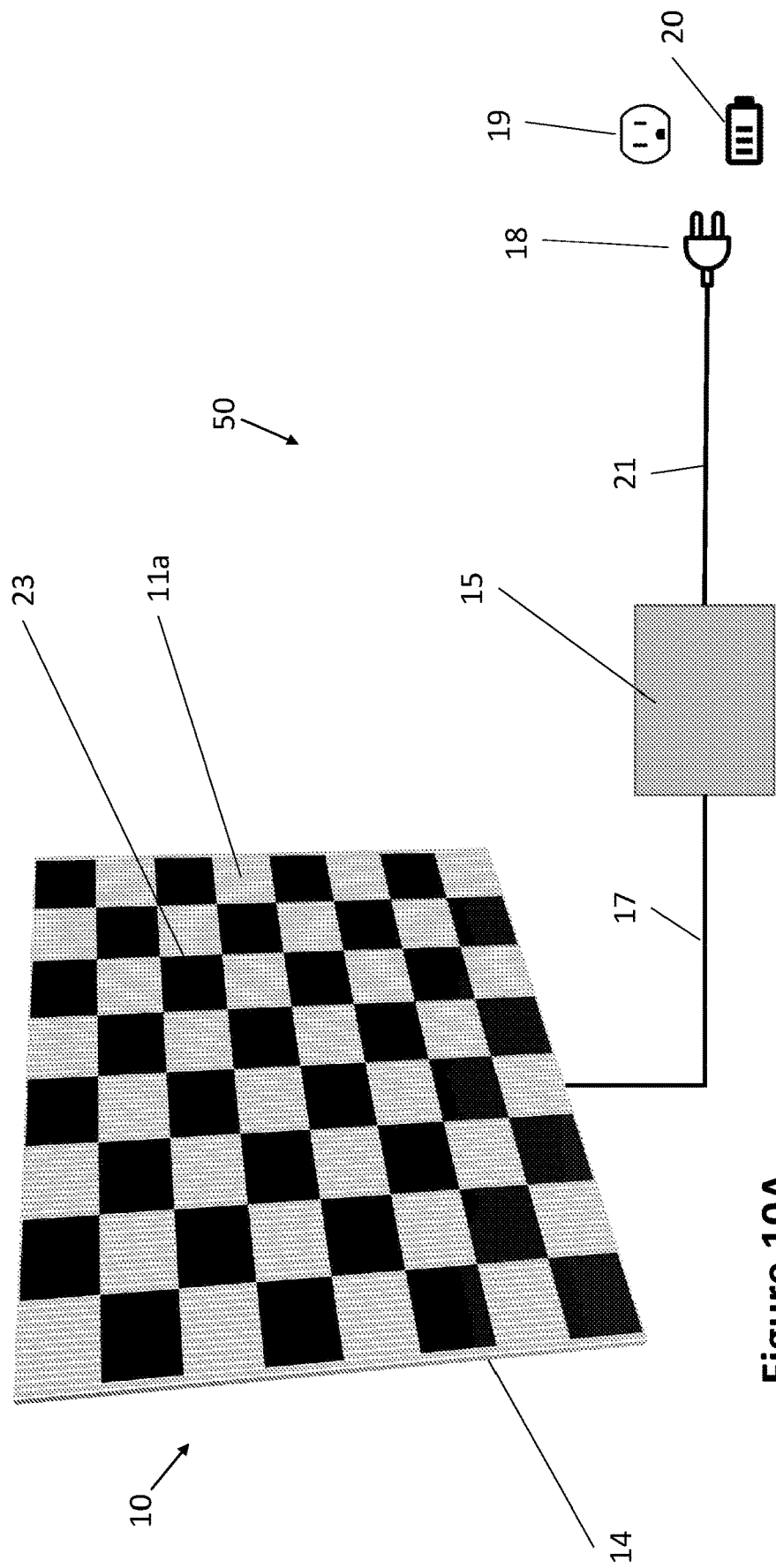
FIG. 10A is an illustration of a system comprising a calibration target, according to some embodiments of the invention.

Reference is now made to FIG. 10A which is an illustration of a system 50 comprising checkerboard calibration target 10 according to some embodiments of the invention. System 50 of FIG. 10A may include substantially the same component as system 50 of FIG. 8. On target 10 a standard checkerboard pattern 23 may be printed (e.g., using a polymeric ink) on first surface 11a of plate 11 having surface roughness of between N9 to N10.

Figure 10B:
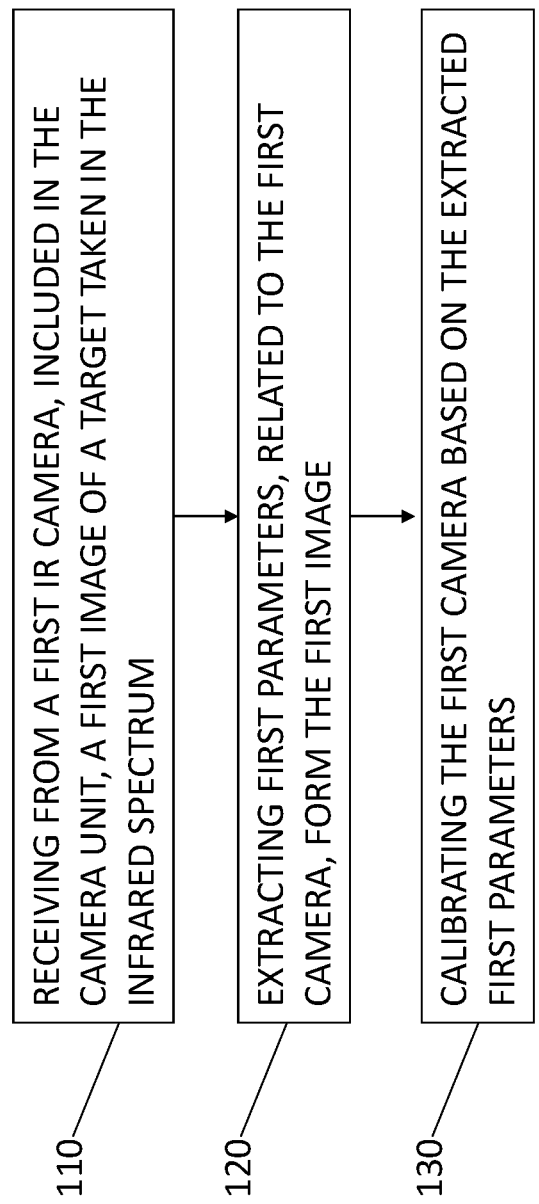
FIG. 10B is a flowchart of a method of calibrating an IR camera unit according to some embodiments of the invention.

Reference is now made to FIG. 10B which is a flowchart of a method for calibrating an IR camera unit according to some embodiments of the invention. As used herein, a camera unit may refer to a unit that includes at least one camera, for example, an IR camera. In some embodiments, camera unit may include two IR cameras, one IR camera and one visible light camera, two IR cameras and two visible light cameras and the like.

Figure 11:
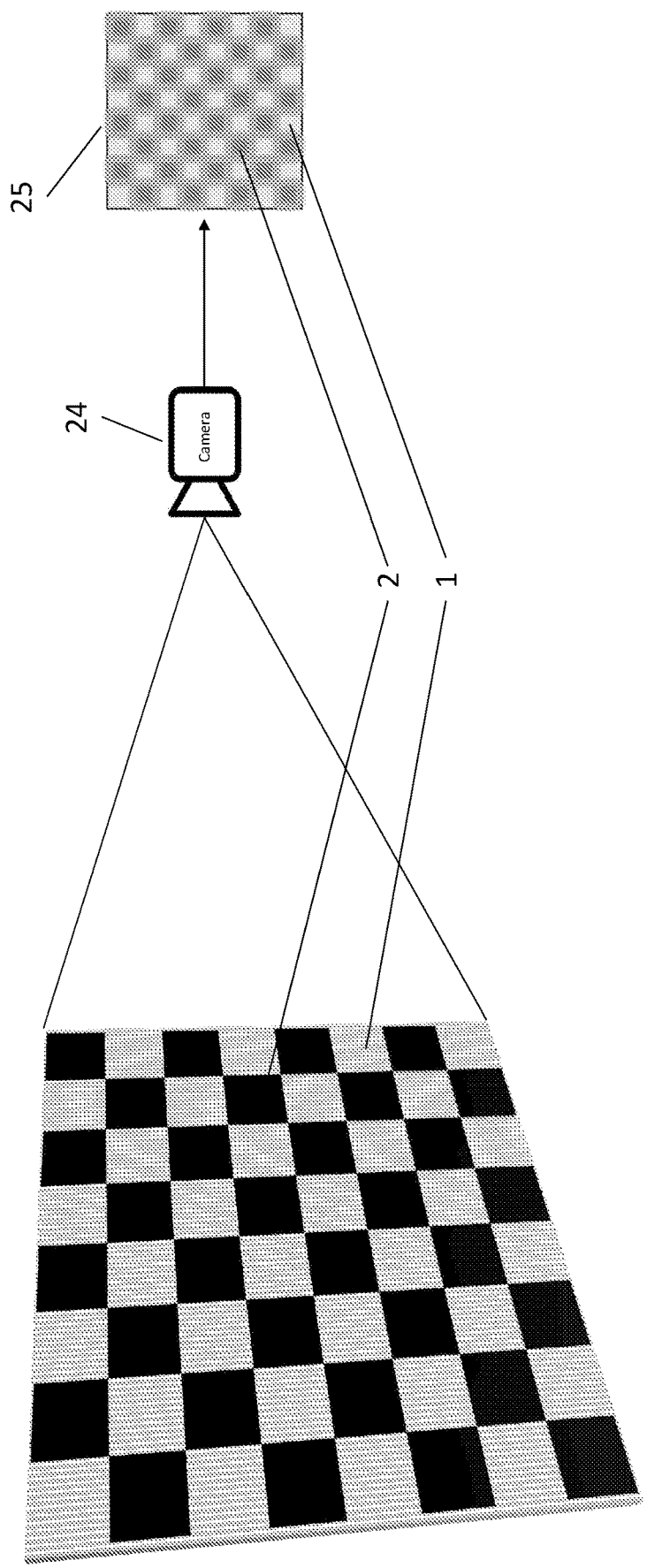
FIG. 11 is an illustration of a thermal IR image of a FIG. 10A when not heated to above room temperature, according to some embodiments of the invention.
Figure 12:
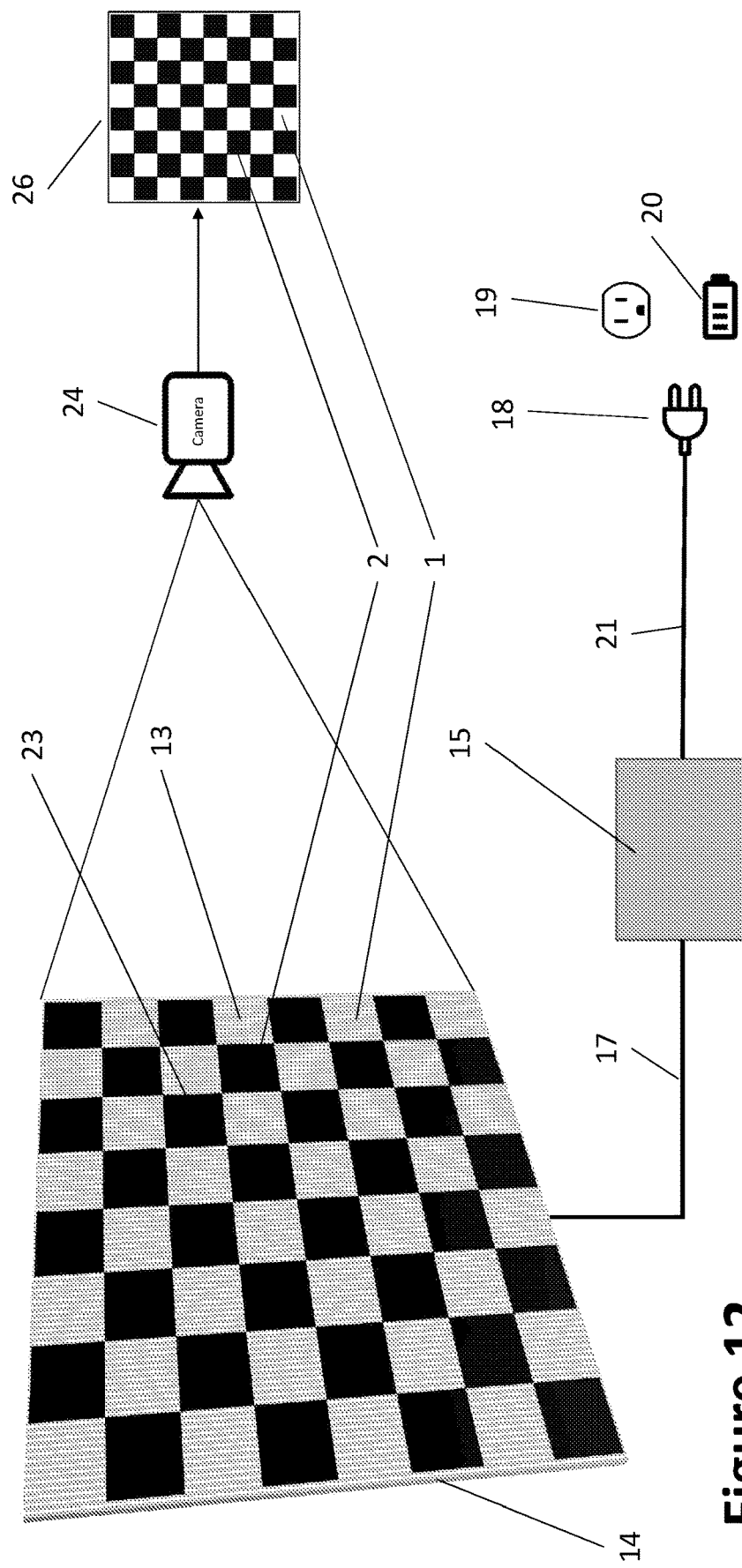
FIG. 12 is an illustration of a thermal IR image of a FIG. 10A heated to above room temperature, according to some embodiments of the invention.

In step 110, a first image of target 10 taken in the infrared spectrum may be received from a first IR camera, included in the camera unit. For example, an image illustrated in FIG. 6B or image 25 may be received from an IR camera 24, illustrated in FIG. 11. In some embodiments, target 10 may be heated using, for example, one or more heating elements 14 of system 50 and the images may be captured after the heating, for example, as illustrated in FIG. 12. In some embodiments, the deviation in the temperature across the entire target is less than 0.5° C. Image 26 captured by IR camera 24 following the heating may have higher contrast between white areas 1 and black areas 2 in comparison of white areas 1 and black areas 2 of image 25, illustrated in FIG. 11.

Referring back to the flowchart of FIG. 10B, in step 120, first parameters, related to the first camera may be extracted form the first image. For example, parameters related to lens focusing, parameters related to sharpness, parameters related to lens quality extracted using MTF tests, geometrical parameters of the camera etc., may be extracted form images such as image 25 and image 26, illustrated in FIGS. 11 and 12.

In step 130, the first camera may be calibrated based on the extracted first parameters. For example, first camera 24 may be calibrated based on parameters extracted from images 25 and/or 26.

Figure 13:
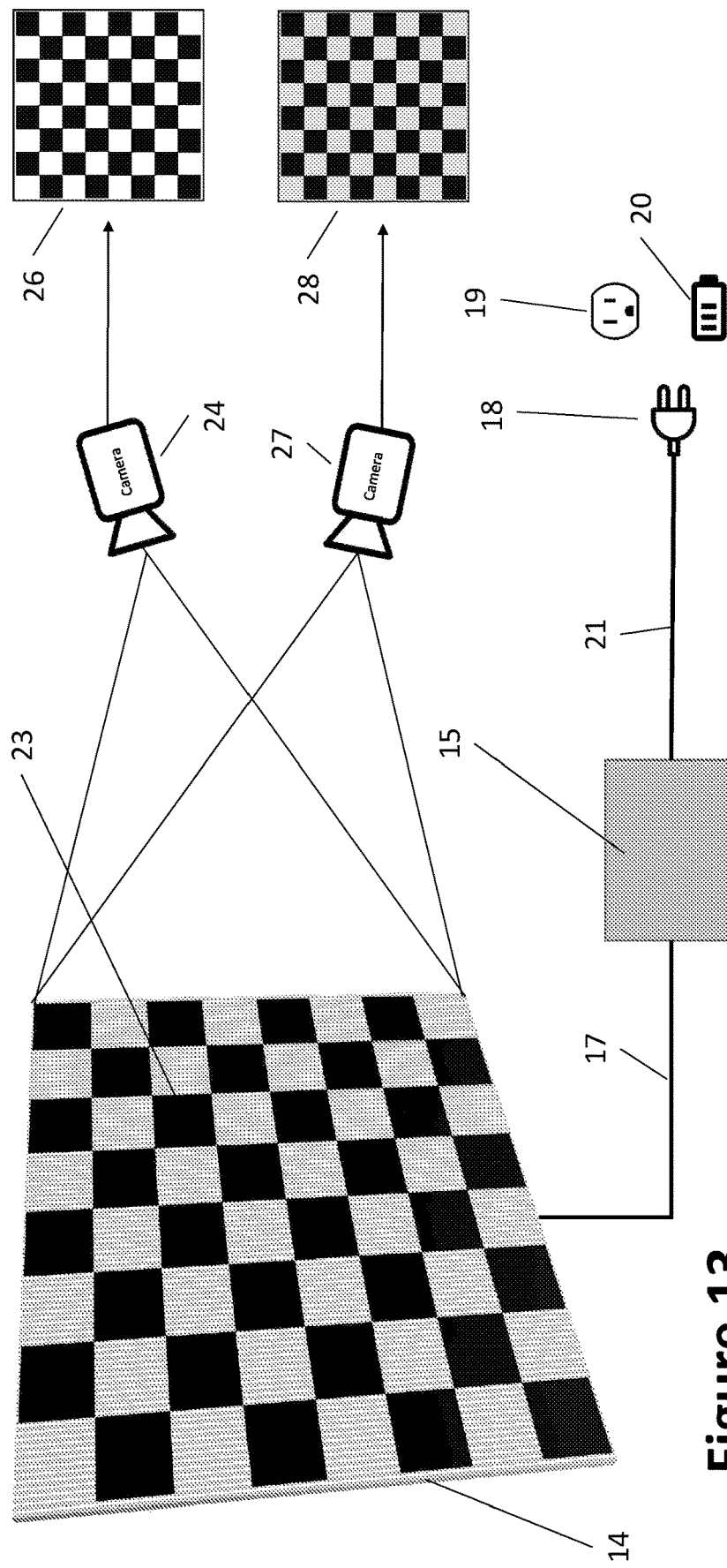
FIG. 13 is an illustration of an extrinsic calibration process conducted between an IR thermal camera and visible light camera simultaneously, according to some embodiments of the invention.

In some embodiments, in addition of the intrinsic calibration conducted to a single camera (e.g., each camera) in the camera unit, an extrinsic calibration process may further be conducted between two or more cameras, as illustrated in FIG. 13.

In some embodiments, the method may further include receiving from a second IR camera, included in the camera unit, a second image of the target taken in the infrared spectrum. For example, a second image 28 may be captured by a second IR camera 27 as illustrated in FIG. 13.

In some embodiments, second parameters, related to the second camera, may be extracted form the second image; and the calibration of the first camera and the second camera may be conducted based on the extracted first parameters and the extracted second parameters.

Experimental Results

Figure 14:
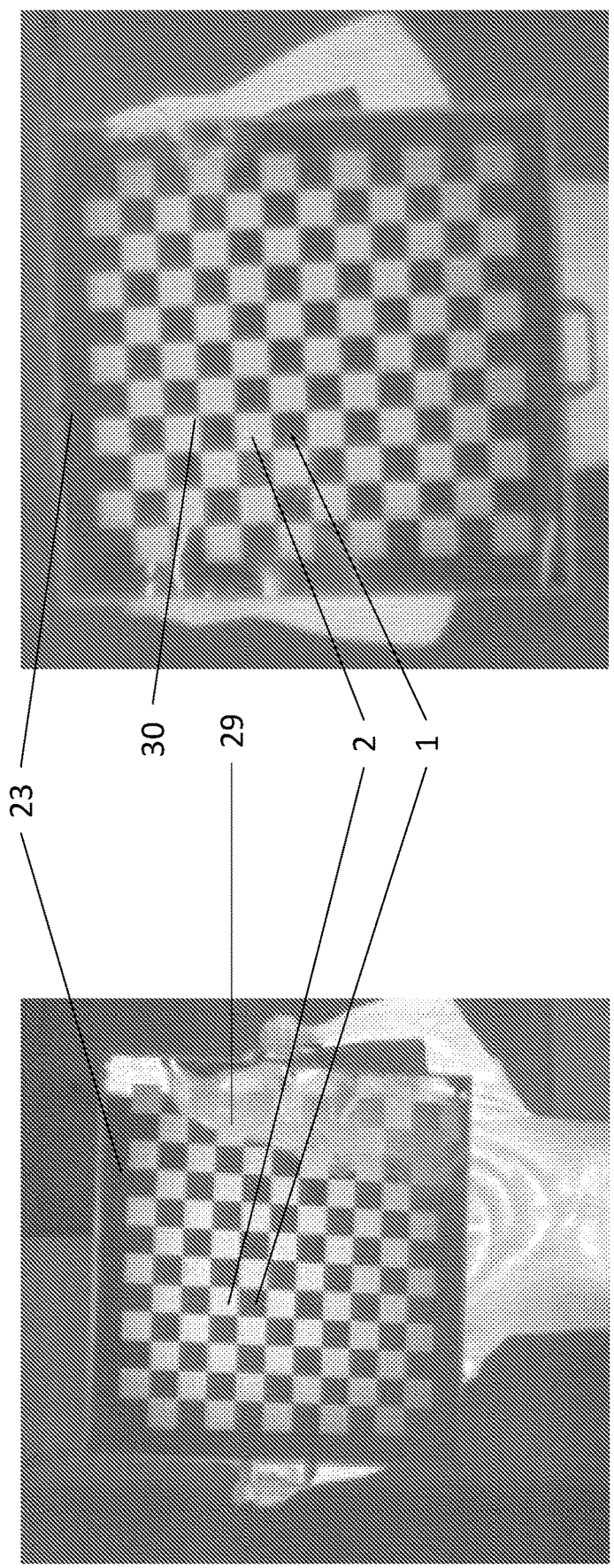
FIG. 14 shows images captured by a thermal camera, according to some embodiments of the invention.

Reference is now made to FIG. 14 which shows images captured by a thermal camera of a calibration target without special polish finishing using only emissivity differences, according to some embodiments of the invention. The images of a standard calibration target 23 was taken by a thermal IR camera in the LWIR. The vague contrast between the black pattern 13 and the first surface 11a of a non-polished aluminum plate are due to the emissivity difference between the ink forming the pattern and the first surface. Areas 2 of pattern 13 have higher emissivity therefore appear white in the thermal image. Black areas 1 are the aluminum plate (not polished) which have lower emissivity therefore reflects the thermal energy from background environment. Reflections from environment are noticeable all over the board causing phase inversion in some of the squares 29 making the images unusable for calibration and testing purposes. In some embodiments, the emissivity difference alone is not sufficient for receiving calibration quality contrast. In order to overcome this deficiency, the board may be externally heated by a heating gun, a flood lamp or by exposure to the natural light of the sun for a while.

These heating methods provides only temporary heat, which fades out quickly and is a factor of heating time and the material.

Figure 15:
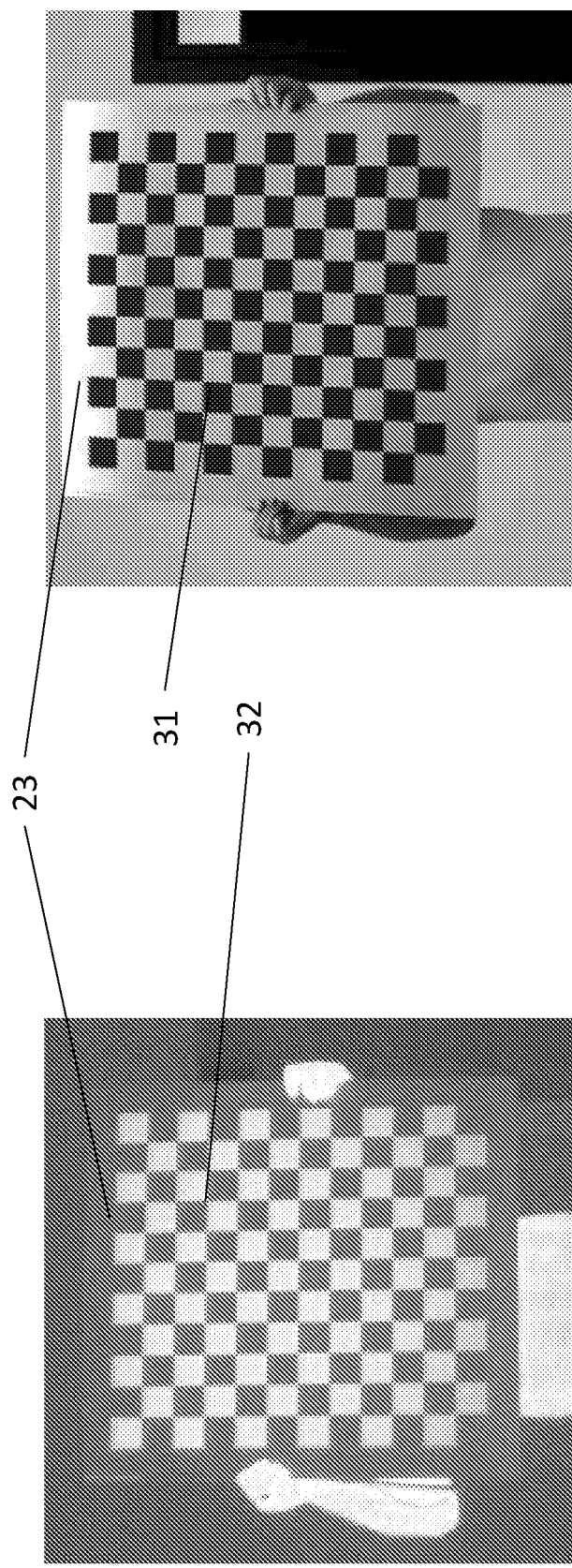
FIG. 15 shows images captured by a thermal camera and visible light camera of a proposed calibration target with special polish finishing and heating elements, according to some embodiments of the invention.

Reference is now made to FIG. 15 which is shows images captured by a thermal IR camera taken in LWIR (left) and visible light camera (right) of a calibration target according to some embodiments of the invention. Images of calibration target 23 with heating elements, heated to 2 deg above room temperature ware taken by both IR thermal camera and visible light camera. The contrast of the image taken by the IR thermal camera was as good as the contrast of the image taken by the visible light camera. In both images corners of the pattern can be detected in the visible light image (corners 31) as well as the thermal camera image (corners 32). This calibration target and method can be used indoors and/or outdoors regardless of environmental conditions since the special metallic backboard does not reflect much of the energy in any of the wavelengths, from visible all the way the LWIR. Heating is homogeneous, continuous, and does not affect other wavelengths.

Dynamic Range Tests

For testing dynamic range of visible and thermal cameras, the target may have different color contrasts just as a standard dynamic range test target for visible light cameras. In addition, multiple heating elements may be placed behind the plate (e.g., plate 11) in substantially the same locations as the colored areas. In some embodiments, each of the elements may be heated to different distinct temperature and marked which may lead to a large dynamic range contrast also in the IR spectrum. Therefore, dynamic range may be measured and tested simultaneously in the IR and visible range.

This technique enables calibration or testing of any camera, visible, NIR, SWIR, MWIR and LWIR under almost any conditions, indoors or outdoors, with extremely high contrast and accuracy using standard methods and protocols taken from visible light camera standards.

Figure 16:
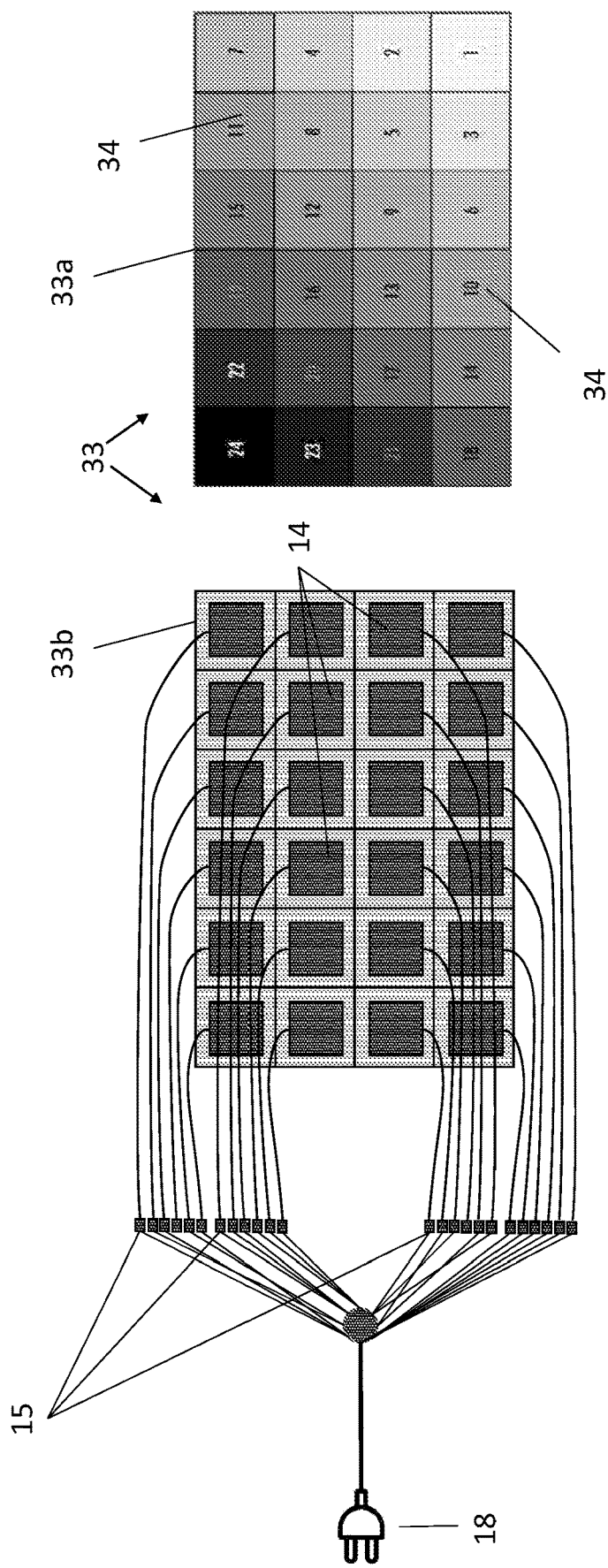
FIG. 16 is an illustration a dynamic range test target, according to some embodiments of the invention.

Reference is now made to FIG. 16 which is an illustration a dynamic range test measurement system, according to some embodiments of the invention.

Dynamic range tests of visible and/or thermal IR camera may be conducted, and the dynamic response of the camera(s) may be measured simultaneously or separately using a target 33. A standard dynamic range system may include a test target 33 having a plurality of printed areas 34 each printed with a different color or grey level. The printed areas may be used for calibrating the visible light camera. In some embodiments, the printed areas may be printed on first surface 33a of target 33. In some embodiments, first surface 33a may have a surface roughness of between N9 to N10. In some embodiments, on second surface 33b of target 33, a plurality of heating elements 14 may be placed in corresponding locations to the locations of printed areas 34. In some embodiments, each heating element 14 may be controlled separately to heat a specific area in target 33 by a corresponding controller 15. In some embodiments, all controllers 15 may be connected to power source 18. In some embodiments, the different temperature of each area may form a contrasted IR image and the different colors or grey levels of printed areas 34 may form a contrasted visible light image. Such a target 33 may allow to conduct dynamic range test in the IR spectrum using similar testing methods as a standard visible dynamic range test procedure.

Therefore, a target according to embodiments of the invention may allow to conduct indoor (or outdoor) tests of both IR cameras and visible light cameras. When the cameras are assembled in the same device (e.g., a vehicle) calibrating both types of cameras simultaneously using the same target under the same conditions may allow receiving high quality images. In some embodiments, information gathered from images captured by cameras calibrated simultaneously may be combined to give better more accurate recognition of objects captured by these cameras. More specifically, 3D images taken by 4 cameras, two IR thermal cameras and two visible light cameras may be processed in order to form an image recognition of objects, for example, objects located in the progression direction of the vehicle.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A target for multispectral geometrical calibration, comprising:
   a substantially flat metallic plate, wherein a first surface of the metallic plate has a surface roughness of between N9 to N10;
   a pattern made from a polymeric ink applied on the first surface;
   an array of a plurality of heating elements, attached to a second surface of the flat metallic plate; and
   a controller configured to control the heating elements to heat the target, to a temperature of 1° C. to 5° C. above room temperature.

2. The target of claim 1, wherein the metallic plate is made from an aluminum alloy.

3. The target according to claim 1, wherein the first surface is characterized by having less than 0.1 emissivity and the pattern is characterized by having more than 0.8 emissivity.

4. The target according to claim 1, wherein the pattern comprises at least two elements having different colors.

5. The target of claim 4, wherein a first element is characterized by a first grey level and a second element is characterized by a second grey level, darker than the first grey level.

6. The target of claim 4, wherein a first element is characterized by a first color and a second element is characterized by a second color, different from the first color.

7. A method of calibrating a multispectral camera unit, comprising:
   receiving from a first camera, included in the camera unit, a first image of a target taken in a first spectral band;
   extracting first parameters, related to the first camera, form the first image;
   receiving from a second camera, included in the camera unit, a second image of the target taken in a second spectral band;
   extracting second parameters, related to the second camera, form the second image; and
   simultaneously calibrating the first camera and the second camera based on the extracted first parameters and the extracted second parameters;
   wherein the target comprises:
   a substantially flat metallic plate, wherein a first surface of the metallic plate has a surface roughness of between N9 to N10;
   a pattern made from a polymeric ink applied on the first surface;
   an array of a plurality of heating elements, attached to a second surface of the flat metallic plate; and
   a controller configured to control the plurality of heating elements to heat the target, to a temperature of 1° C. to 5° C. above room temperature.

8. The method according to claim 7, wherein the first spectral band is different from the second spectral band, and wherein the first spectral band and second spectral band are selected from a list consisting of: visible light, NIR, SWIR, MWIR and LWIR.

9. The method of claim 7, wherein the controller is configured to control the plurality of heating elements such that deviation in the temperature across the entire target is less than 0.5° C.

10. The method of claim 7, wherein the pattern in the target comprises at least two elements having different colors, and the method further comprises:
    heating the target to at least two different temperatures;
    receiving images of the target taken at the at least two different temperatures;
    identifying changes between the at least two elements in the images; and
    calibrating the camera based on the identified changes.

11. The target of claim 1, wherein the controller is configured to control the heating elements to heat the target homogeneously, such that temperature difference across the first surface does not exceed 0.5° C.

12. The target of claim 1, wherein the target is a modulation transfer function (MTF), configured to enable an MTF algorithm to calculate at least one parameter of an imaging system selected from resolution, spatial frequency, lens quality, lens focus, and sharpness.

13. The target of claim 1, wherein the pattern comprises a plurality of printed areas, each printed with a different color or grey level and wherein the plurality of heating elements are placed in corresponding locations to the locations of the printed areas.

14. The target of claim 13, wherein the plurality of printed areas are configured to allow performance of dynamic range calibration of a visible light camera, and wherein each heating element is controlled separately to heat a specific area in target, to allow simultaneous performance of dynamic range calibration of an Infrared camera.

* * * * *